(12) United States Patent
Ozaki

(10) Patent No.: US 8,279,762 B2
(45) Date of Patent: Oct. 2, 2012

(54) INTERFACE SWITCHING METHOD AND DEVICE

(75) Inventor: Hirokazu Ozaki, Tokyo (JP)

(73) Assignee: Nec Corporation, Tokyo (JP)

( * ) Notice: Subject to any disclaimer, the term of this patent is extended or adjusted under 35 U.S.C. 154(b) by 339 days.

(21) Appl. No.: 12/145,095

(22) Filed: Jun. 24, 2008

(65) Prior Publication Data

US 2009/0003326 A1 Jan. 1, 2009

(30) Foreign Application Priority Data

Jun. 26, 2007 (JP) ................................ 2007-167099

(51) Int. Cl.
*H04Q 11/00* (2006.01)
(52) U.S. Cl. ........................ 370/250; 370/359
(58) Field of Classification Search .................. 370/251, 370/359
See application file for complete search history.

(56) References Cited

U.S. PATENT DOCUMENTS

| | | | |
|---|---|---|---|
| 6,898,177 B1 * | 5/2005 | Grenier et al. ................ | 370/225 |
| 7,031,341 B2 * | 4/2006 | Yu .................................. | 370/469 |
| 7,315,511 B2 * | 1/2008 | Morita et al. ................. | 370/227 |
| 7,653,526 B1 * | 1/2010 | Ryle et al. ...................... | 703/23 |
| 2008/0138084 A1 * | 6/2008 | Youn et al. .................... | 398/158 |

OTHER PUBLICATIONS

"Series G: Transmission Systems and Media, Digital Systems and Networks, Digital transmission systems—Digital networks—SDH network characteristics, Types and characteristics of SDH network protection architectures", (Oct. 1998), pp. 28-32, G. 841, International Telecommunications Union, Standardization Sector of ITU.
"Series G: Transmission Systems and Media, Digital Systems and Networks, Ethernet over Transport aspects—General aspects", "Series Y:Global Information Infrastructure, Internet Protocol Aspects and Next-Generation Networks, Internet protocol aspects—Transport", (Jun. 2006), pp. 15-21, G.8031/Y.1342, International Telecommunications Union, Standardization Sector of ITU.

* cited by examiner

*Primary Examiner* — Mark Rinehart
*Assistant Examiner* — Matthew Hopkins

(57) ABSTRACT

In a redundant system where multiple network interfaces can be switched, an interface switching device includes: a transformer for transforming automatic switch information between a predetermined type used for a predetermined network interface and each of other types used for network interfaces other than the predetermined network interface; a switch controller for performing switch control for automatic switch information of the predetermined type; and a control interface for connecting a first network interface to the switch controller via the transformer when first automatic switch information received from the first network interface is not of the predetermined type.

15 Claims, 15 Drawing Sheets

FIG. 4

ETHERNET REQUEST/STATE

| | | |
|---|---|---|
| 1111 | LOCKOUT (LO) | Highest |
| 1110 | SIGNAL FAIL FOR PROTECTION (SF-P) | ↕ |
| 1101 | FORCED SWITCH (FS) | |
| 1011 | SIGNAL FAIL FOR WORKING (SF) | |
| 1001 | SIGNAL DEGRADE (SD) (NOT SET YET) | |
| 0111 | MANUAL SWITCH (MS) | |
| 0101 | WAIT TO RESTORE (WTR) | |
| 0100 | EXERCISE (EXER) | |
| 0010 | Reserved (FOR REVERSE REQUEST) | |
| 0001 | DO NOT REVERT (DNR) | |
| 0000 | NO REQUEST (NR) | Lowest |
| OTHERS | Reserved | |

↕

SDH/SONET TYPES OF REQUEST

| ORDER | CONDITION/STATE/EX RQ | BITS 1234 |
|---|---|---|
| Highest | LOCKOUT | 1111 |
| | FORCED SWITCH | 1110 |
| | SIGNAL FAIL HIGH PRIORITY | 1101 |
| | SIGNAL FAIL LOW PRIORITY | 1100 |
| | SIGNAL DEGRADE HIGH PRIORITY | 1011 |
| | SIGNAL DEGRADE LOW PRIORITY | 1010 |
| | UNUSED | 1001 |
| | MANUAL SWITCH | 1000 |
| | UNUSED | 0111 |
| | WAIT TO RESTORE | 0110 |
| | UNUSED | 0101 |
| | EXERCISE | 0100 |
| | UNUSED | 0011 |
| | REVERSE REQUEST | 0010 |
| | DO NOT REVERT | 0001 |
| Lowest | NO REQUEST | 0000 |

WORKING SYSTEM = SDH/SONET

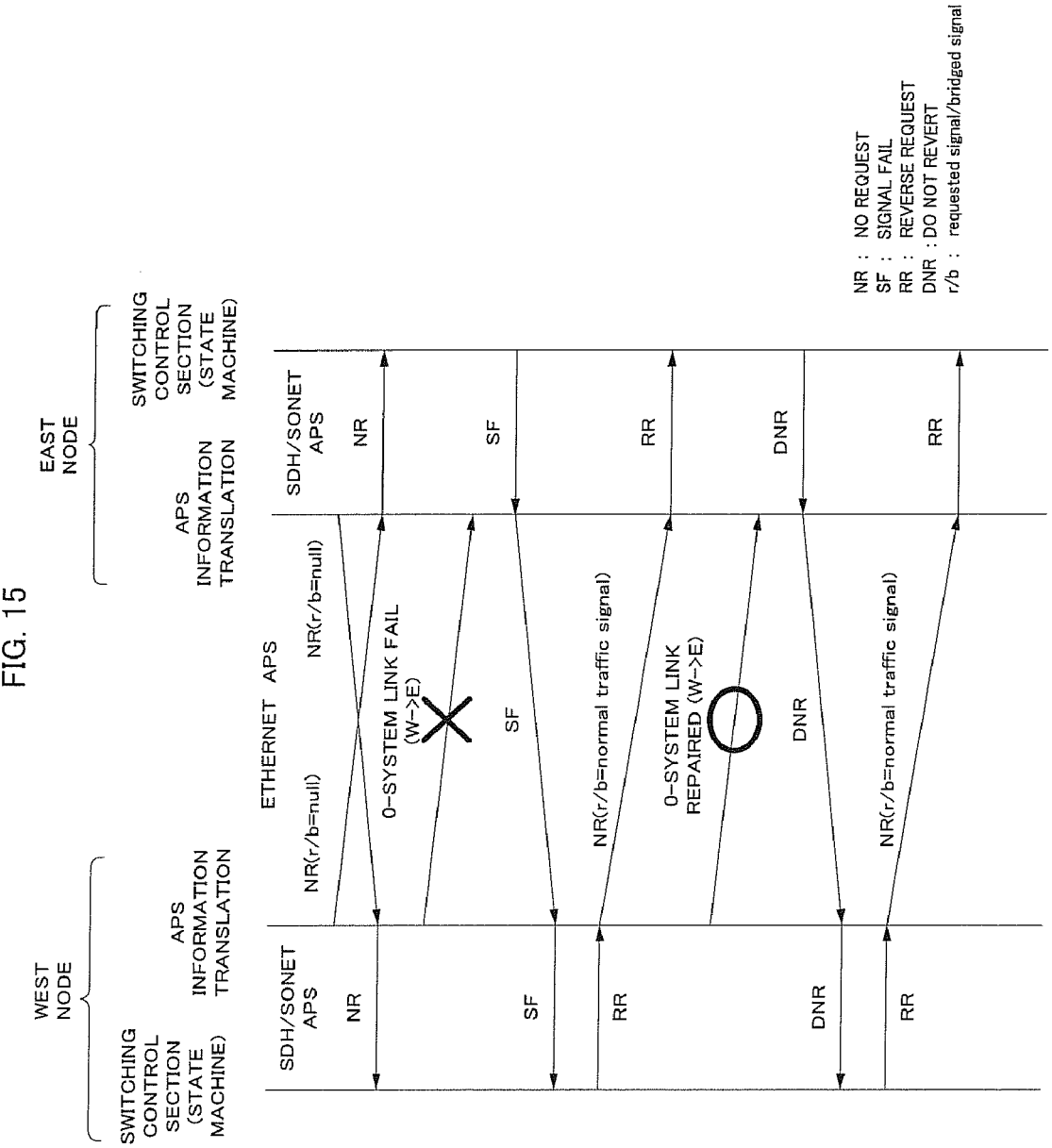

INTERFACE SWITCHING METHOD AND DEVICE

This application is based upon and claims the benefit of priority from Japanese Patent Application No. 2007-167099, filed on Jun. 26, 2007, the disclosure of which is incorporated herein in its entirety by reference.

BACKGROUND OF THE INVENTION

1. Field of the Invention

The present invention relates to a method and device for switching interfaces in a communication device included in a redundant system.

2. Description of the Related Art

SDH (Synchronous Digital Hierarchy)/SONET (Synchronous Optical NETwork) is widely used as global-standard network interfaces particularly in wide area networks. In recent years, for the purpose of further bringing down costs, there is a move afoot to apply Ethernet™ (hereinafter, referred to as "Ethernet") to wide area networks. In this case, since there are many occasions when a single communication device must accommodate both SDH/SONET and Ethernet interfaces, a device has also been developed in which a SDH/SONET interface card and an Ethernet interface card can be freely replaced with one another in a single slot.

To apply Ethernet to wide area networks, it is necessary to enhance the functions of monitoring and controlling a network, and work for the standardization thereof is now in progress in ITU-T. Specifically, a frame for monitoring and controlling (Ethernet OAM frame) is defined in an Ethernet frame, causing a wide area network to be monitored and controlled. In this standardization work, in order to improve the reliability of Ethernet, it has been standardized to implement a redundant system of SDH/SONET on Ethernet (see ITU-T Standard G.8031/Y.1342, pp. 15-22). Specifically, a frame for switching control, called ETH-APS, is defined, and control information is exchanged between link-connected opposite devices, whereby bidirectional switching is accomplished.

However, although information carried in the above-mentioned ETH-APS frame is basically and approximately the same as the automatic protection switching (APS) bytes K1 and K2 of SDH/SONET, there is an essential difference between them: a main-signal interface for one of them is of a synchronization type, and that for the other is of a non-synchronization type. Additionally, the APS bytes and ETH-APS frame are also different in bit assignment.

Accordingly, to enable a single device to accommodate both interfaces, a switch control section for SDH/SONET and a switch control section for Ethernet may be provided independently and switched depending on the interface type. In other words, it is necessary to mount both the SDH/SONET switching control section and Ethernet switching control section on a control section, resulting in the device being complicated and expensive.

Moreover, the above-described method only assumes that the network interface sections support the same type of network (i.e., any one of SDH/SONET and Ethernet), and no consideration is given to a redundant system in a case of network interfaces for different types of networks. Accordingly, in the above-described example, a SDH/SONET interface section and an Ethernet interface section, for example, cannot be mounted at the same time.

SUMMARY OF THE INVENTION

An object of the present invention is to provide an interface switching method and device that makes it possible to switch between different types of interfaces, without complicating the configuration.

According to the present invention, an interface switching device in a redundant system including a plurality of network interfaces which can be switched depending on automatic switch information, includes: a transformer for transforming automatic switch information between a predetermined type used for a predetermined network interface and each of other types used for network interfaces other than the predetermined network interface; a switch controller for performing switch control for automatic switch information of the predetermined type; and a control interface for connecting a first network interface to the switch controller via the transformer when first automatic switch information received from the first network interface is not of the predetermined type.

By virtue of the interface switching device according to the present invention, it is possible to switch between different types of interfaces, without complicating the configuration.

BRIEF DESCRIPTION OF THE DRAWINGS

FIG. 4 is a diagram of correspondences, showing an example of APS information transformation rules between SDH/SONET APS information and Ethernet APS information.

FIG. 15 is a diagram showing a sequence of APS information communication in a redundant system in which nodes, each having the interface switching device according to the present exemplary embodiment, are link-connected.

DETAILED DESCRIPTION OF THE PREFERRED EMBODIMENTS

An interface switching device according to the present invention makes it possible to control the switching between different types of network interfaces through switching control for a single type of network interface, by using a function of transforming APS information between the different types of network interfaces. The present invention particularly provides a method for integrationally processing the switching between a digital synchronous network interface and an Ethernet interface, thereby achieving the simplification and lower price of a device. Moreover, the present invention makes it possible to build a redundant architecture in which different types of interface cards are used as a set, extending the flexibility of the network architecture, also achieving enhanced maintainability.

Hereinafter, an exemplary embodiment of the present invention will be described in detail by showing a digital synchronous network interface (here, SDH/SONET interface) and an Ethernet interface as an example of the different types of interfaces.

Figure 1:
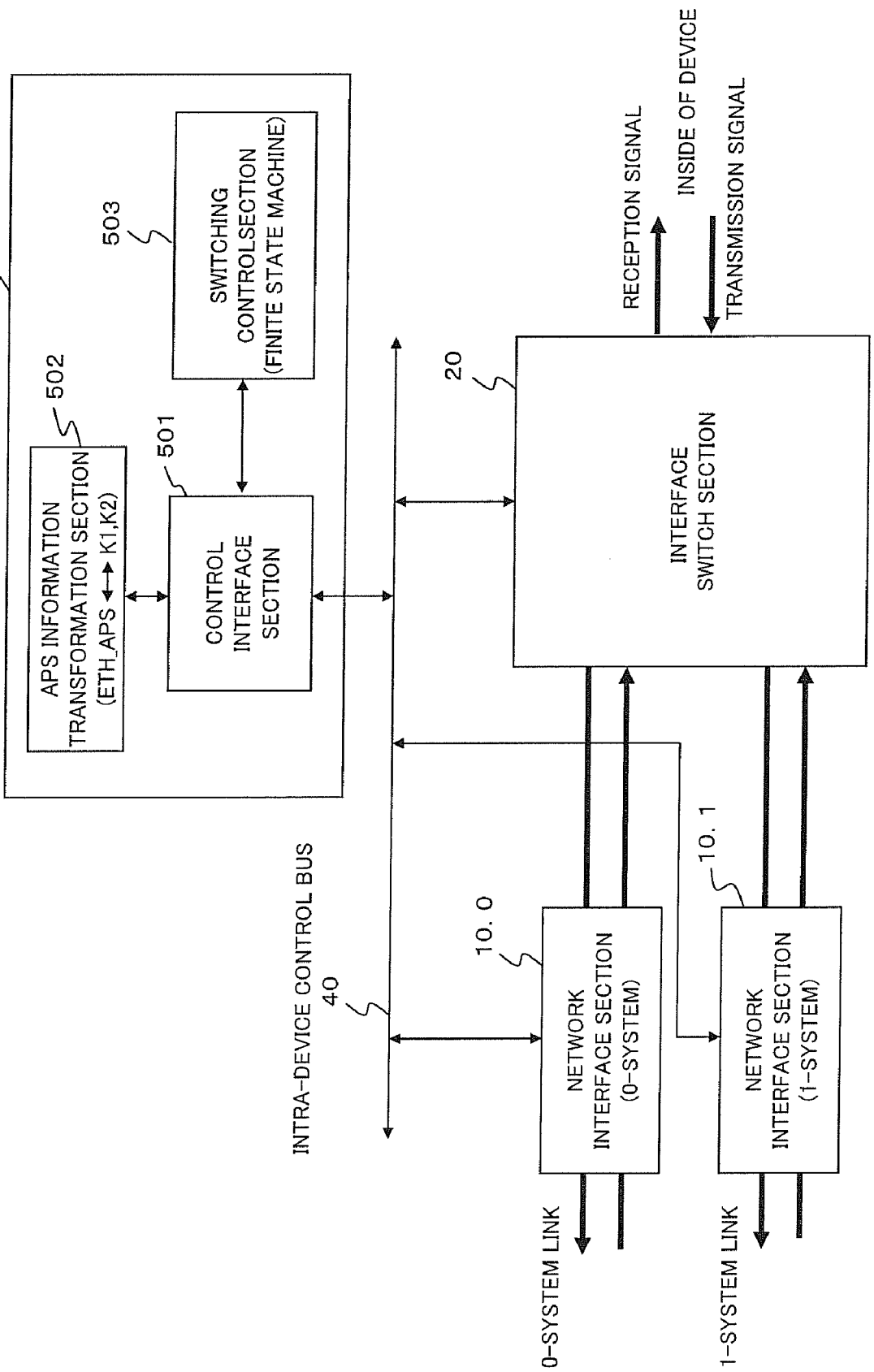
FIG. 1 is a schematic block diagram of an interface switching device according to an exemplary embodiment of the present invention.

FIG. 1 is a schematic block diagram of an interface switching device according to an exemplary embodiment of the present invention. Any combination of SDH/SONET and Ethernet can apply to a network interface section 10.0 for a 0-system and a network interface section 10.1 for a 1-system, which will be described later. The network interface sections 10.0 and 10.1 are switched by an interface switch section 20. Normally, the 0-system network interface section 10.0 is selected for working. Accordingly, of a main signal for the 0-system received by the network interface section 10.0 and a main signal from the 1-system received by the network interface section 10.1, the main signal received by the network interface section 10.0 is selected and transferred into the device. A main signal to be transmitted from the device is branched at the interface switch section 20 into two signals, which are then sent out through the network interface sections 10.0 and 10.1 respectively. The details thereof will be described later.

Switching control of the interface switch section 20 is performed by an intra-device control section 50. A control interface section 501 of the intra-device control section 50, which is connected to the network interface section 10.0 and/or network interface section 10.1 through an intra-device control bus 40, receives APS information, failure monitoring result information and the like and transmits control information, which will be described later. The intra-device control section 50 is further provided with an APS information transformation section 502 and a switching control section 503.

The APS information transformation section 502 is provided with a table for transformation between Ethernet APS information (ETH_APS) and SDH/SONET APS information (K1, K2), which will be described later. The switching control section 503 is composed of a finite state machine that performs switching control on a network interface of one of the types.

In the present exemplary embodiment, the switching control section 503 performs switching control on a SDH/SONET interface. Accordingly, when Ethernet APS information (ETH_APS) is input from the control bus 40, the control interface section 501 transfers the information to the APS information transformation section 502, where the Ethernet APS information is transformed into SDH/SONET APS information (K1, K2), which is then output to the switching control section 503. Additionally, when SDH/SONET APS information (K1, K2) is input from the control bus 40, the control interface section 501 transfers the SDH/SONET APS information directly to the switching control section 503, without transferring the information to the APS information transformation section 502.

Reversely, if the destination of APS information (K1, K2) output from the switching control section 503 is an Ethernet interface, the control interface section 501 transfers the information to the APS information transformation section 502, where the information is transformed into Ethernet APS information (ETH_APS), which is then transmitted to the destination Ethernet interface through the control bus 40. When the destination of APS information (K1, K2) output from the switching control section 503 is a SDH/SONET interface, the control interface section 501 transmits the information directly to the destination SDH/SONET interface through the control bus 40, without transferring the information to the APS information transformation section 502.

Moreover, the control interface section 501 transmits control information output from the switching control section 503 to the interface switch section 20 through the control bus 40. When the received control information instructs to switch interfaces, the control interface section 501 carries out switching between the network interface sections 10.0 and 10.1.

Hereinafter, a specific configuration and operations of the present exemplary embodiment will be described in more detail, by taking a 1+1 bidirectional system as an example.

1. Device Circuit Structure

Figure 2:
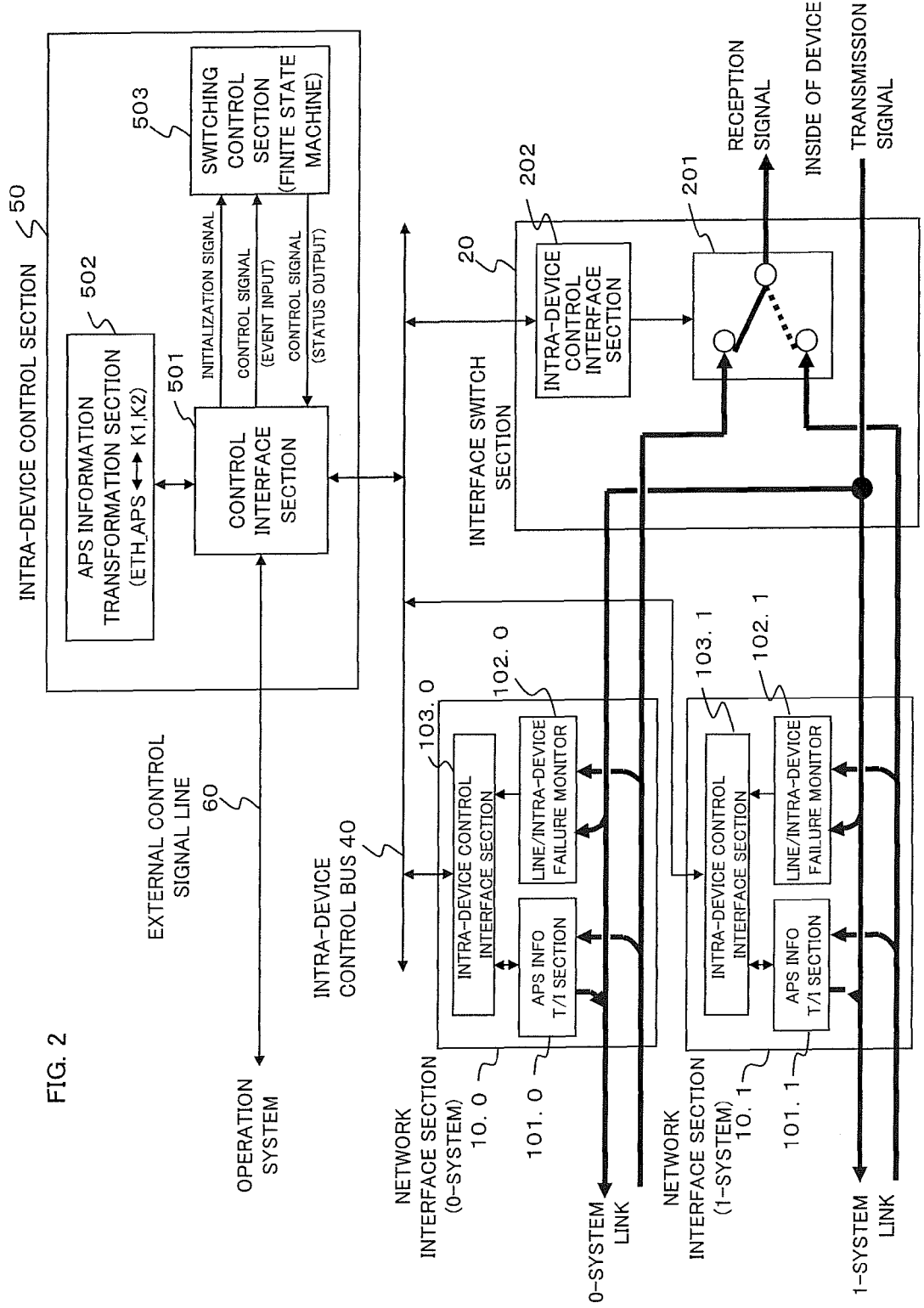
FIG. 2 is a more detailed block diagram of the interface switching device shown in FIG. 1.

FIG. 2 is a more detailed block diagram of the interface switching device shown in FIG. 1. Note that, in FIGS. 1 and 2, those blocks having the same functions are denoted by the same reference numerals. As described above, here, the 0-system is selected for working, and the 1-system is for protection. Since bidirectional switching is performed in APS switching, a link-connected opposite device on the other end of the link also similarly selects the 0-system as a working system.

The network interface sections 10.0 and 10.1 have similar configurations and include APS information termination/insertion (T/I) sections 101.0 and 101.1, line/intra-device failure monitor sections 102.0 and 102.1, and intra-device control interface sections 103.0 and 103.1, respectively. In FIG. 2, "termination/insertion" and "information" are abbreviated to "T/I" and "INFO", respectively.

The APS information termination/insertion section 101.0 terminates and inputs APS information from a 0-system link reception signal, and also performs processing for inserting APS information into a 0-system link transmission signal. The line/intra-device failure monitor section 102.0 has a function of monitoring 0-system link reception and transmission signals to detect an abnormality in a reception signal and a failure inside the interface. The control interface section 103.0 transmits/receives information to/from the intra-device control section 50 through the intra-device control bus 40. Incidentally, it is defined by recommendations that APS information extracted by the APS information termination/insertion section 101.0 is notified to the intra-device control section 50 when the network interface section 10.0 is for protection (see ITU-T Standard G.8031/Y.1342, pp. 15-22, and ITU-T Standard G.841, pp. 28-32).

The APS information termination/insertion section 101.1, line/intra-device failure monitor section 102.1, and intra-device control interface section 103.1 of the network interface section 10.1 also perform similar operations, and therefore description thereof will be omitted.

The interface switch section 20 includes a selector switch 201 and an intra-device control interface section 202. When the interface switch section 20 has received a control signal from the intra-device control section 50 through the intra-device control interface section 202, the selector switch 201 selects a 0-system or 1-system reception signal in accordance with control information in the control signal. A transmission signal is branched into two signals, which are output to the 0-system and 1-system network interface sections 10.0 and 10.1 respectively.

The APS information transformation section 502 of the intra-device control section 50 is provided with a table storing transformation rules for transformation between the Ethernet APS information (ETH_APS) and SDH/SONET APS information (K1, K2). The switching control section 503 is a finite state machine that performs switching control, here, on a SDH/SONET network interface. The switching control section 503 receives, as event inputs, APS information extracted by the APS information termination/insertion section of the protection-system network interface section, and results of monitoring from the line/intra-device failure monitor sections 102.0 and 102.1. As status outputs responding to the inputs, the switching control section 503 outputs APS information and switching control information.

Note that although the intra-device control section 50 can be implemented as hardware, it can also be implemented as software by executing an interface switching control program on a program-controlled processor such as a CPU.

2. APS Information Transformation

Figure 3:
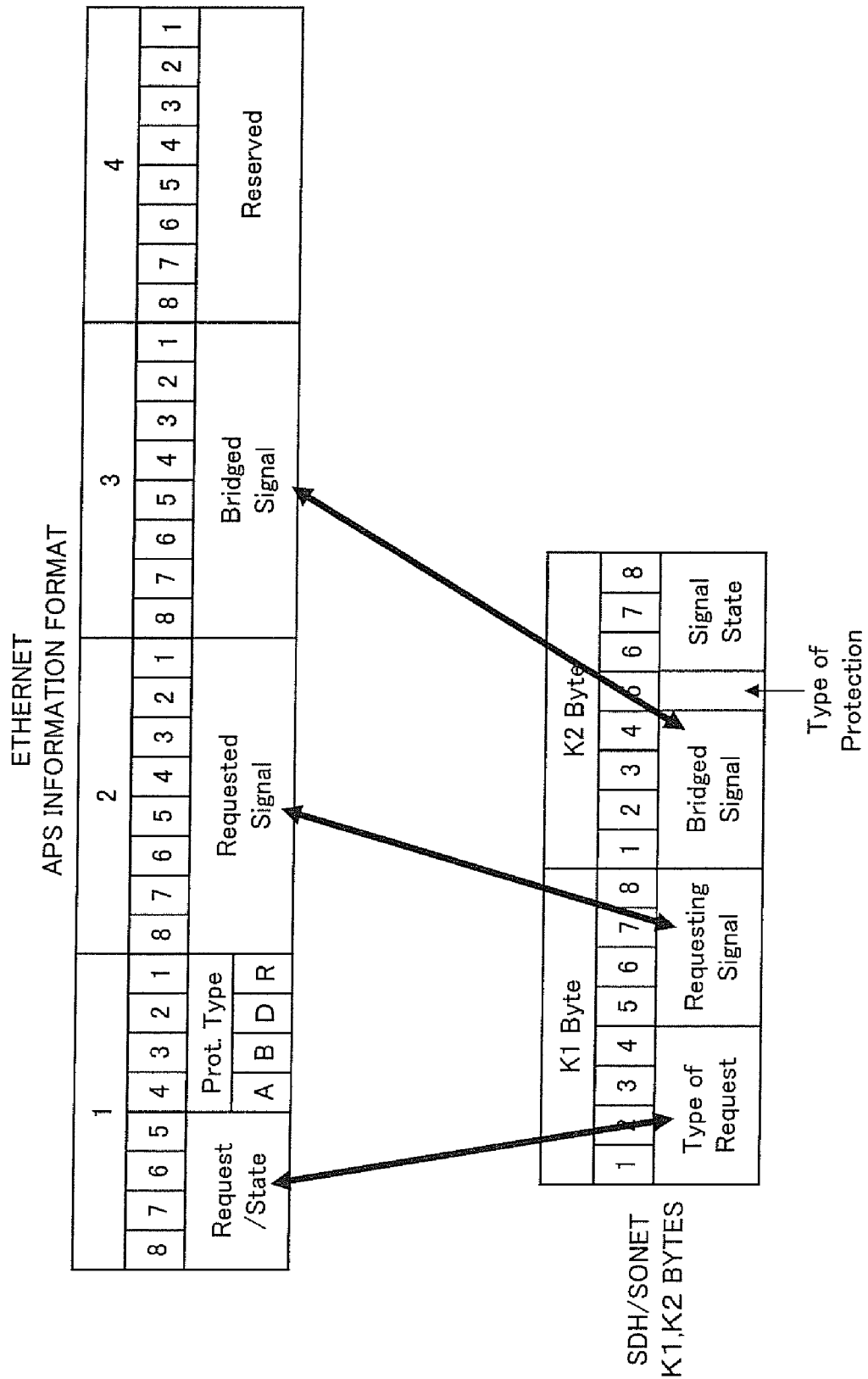
FIG. 3 is a format diagram showing an example of correspondences between Ethernet APS information and SDH/SONET APS information, to describe APS information transformation rules stored in an APS information transformation section.

FIG. 3 is a format diagram showing an example of correspondences between the Ethernet APS information and SDH/SONET APS information, to describe the APS information transformation rules used by the APS information transformation section 502. Here, as an example, shown are correspondences between Ethernet APS information (shown in Table 11-1, ITU-T Standard G.8031/Y.1342, pp. 17-18) and K1/K2 APS information (shown in Table 7-1, ITU-T Standard G.841, pp. 37-38). Specifically, "Request/State," "Requested Signal," and "Bridged Signal" of the Ethernet APS information correspond to "Type of Request," "Requesting Signal," and "Bridged Signal" of the SDH/SONET K1, K2 bytes, respectively.

FIG. 4 is a diagram of correspondences showing an example of the APS information transformation rules for transformation between the SDH/SONET APS information and Ethernet APS information. Here, shown are correspondences between the "Request/State" of the Ethernet APS information and "Types of Request" of the SDH/SONET K1 byte. They basically correspond to each other but are slightly different in bit assignment. For example, "Forced Switch (FS)" of the Ethernet APS information is represented by "1101," but "Forced switch" of the SDH/SONET K1 byte is represented by "1110." Accordingly, similar functions between the Ethernet APS information and SDH/SONET APS information are associated with each other in advance and stored as transformation rules in the APS information transformation section 502. An example of the transformation rules will be presented next.

Figure 5:
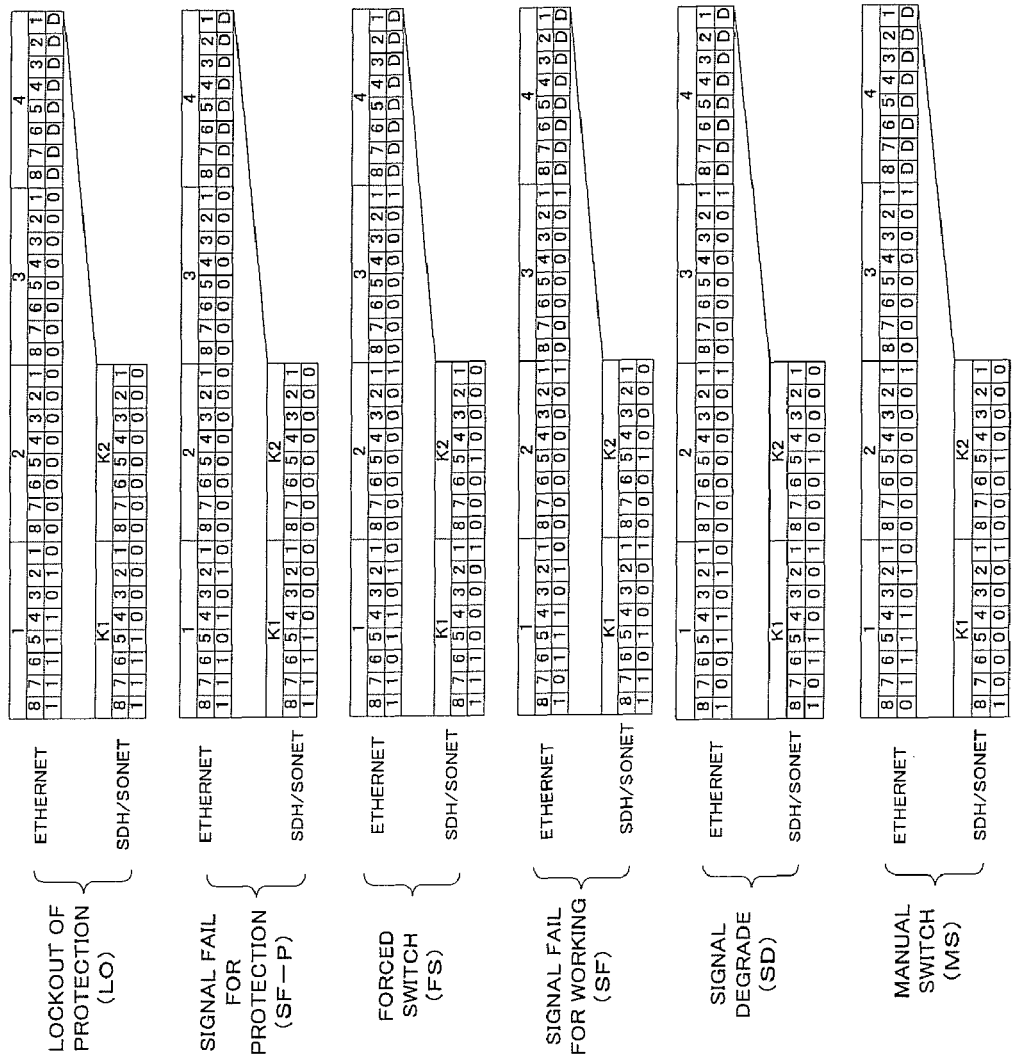
FIG. 5 is a diagram showing part of the example of APS information transformation rules between Ethernet APS information and SDH/SONET APS information as shown in FIG. 4.
Figure 6:
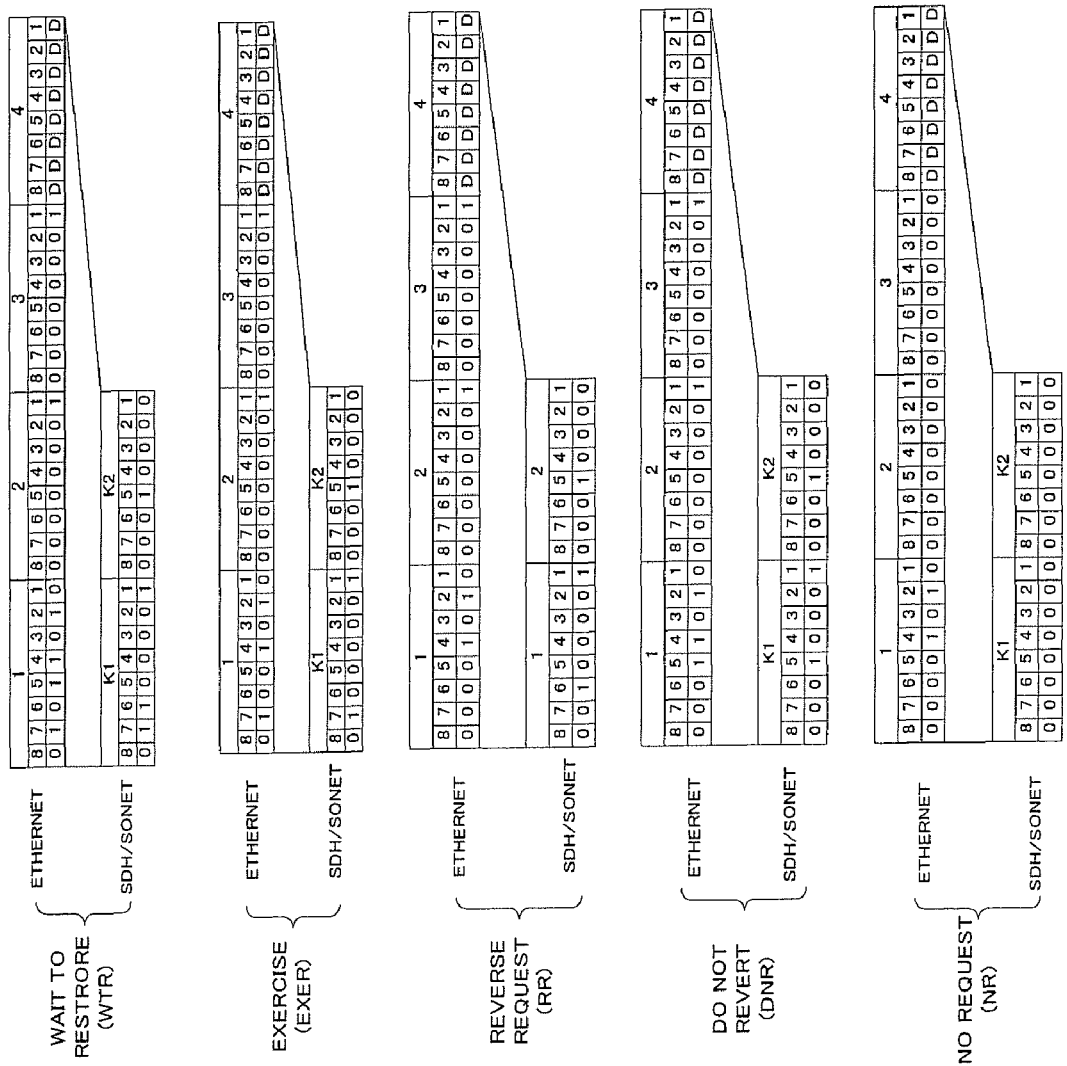
FIG. 6 is a diagram showing other part of the example of the APS information transformation rules as shown in FIG. 4.

FIGS. 5 and 6 are diagrams showing an example of the transformation rules between Ethernet APS information and SDH/SONET APS information. Here, a 1+1 bidirectional non-revertive mode is shown as an example. Note that since "Reverse Request (RR)" has not defined yet in Ethernet APS information, "Reverse request (RR)" of the SDH/SONET K1 byte, which is "0010," is transformed to "No Request (NR)" with "Requested Signal" in Ethernet APS information.

By using such transformation rules in the APS information transformation section 502, it is possible to perform integrational interface switching control as described hereinafter.

3. SDH/SONET+SDH/SONET

Figure 7:
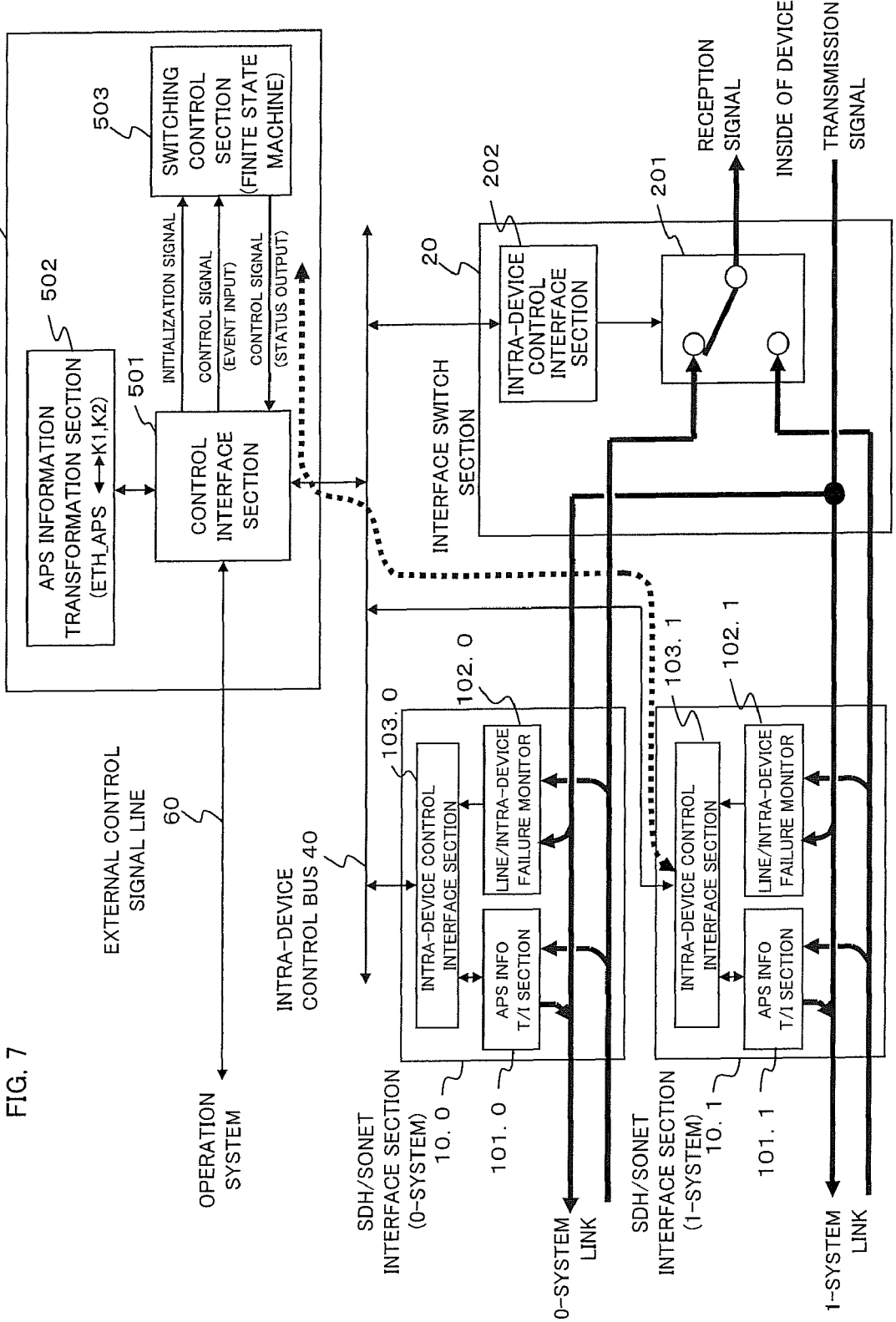
FIG. 7 is a block diagram of the interface switching device according to the present exemplary embodiment on which SDH/SONET interfaces are mounted for both of 0- and 1-systems.
Figure 8:
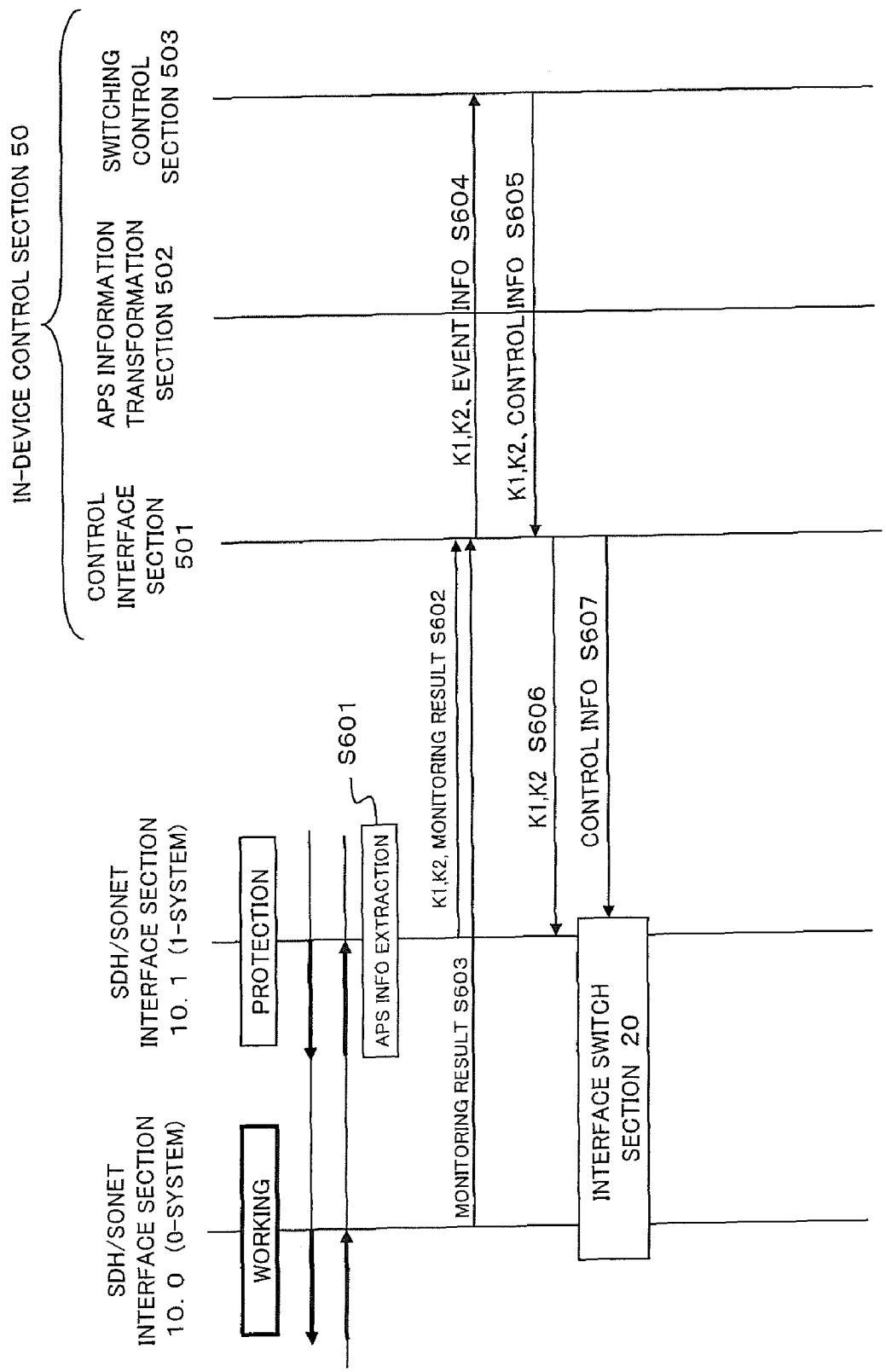
FIG. 8 is a sequence diagram for describing the operations of the interface switching device shown in FIG. 7.

FIG. 7 is a block diagram of the interface switching device according to the present exemplary embodiment on which SDH/SONET interfaces are mounted for both of the 0- and 1-systems. FIG. 8 is a sequence diagram for describing the operations of the interface switching device shown in FIG. 7.

Referring to FIG. 7, since the selector switch 201 selects the 0-system as a working system, K1 and K2 bytes, which are SDH/SONET APS information, are extracted by the 1-system interface section 10.1 (Step S601) and transmitted to the intra-device control section 50 along with a result of monitoring by the line/intra-device failure monitor section 102.1 (Step S602). The line/intra-device failure monitor section 102.0 of the working-system interface section 10.0 transmits its own monitoring result to the intra-device control section 50 (Step S603).

The control interface section 501 of the intra-device control section 50 transfers the result of line/intra-device monitoring received from the SDH/SONET interface section 10.0, and the APS information (K1 and K2 bytes) and result of line/intra-device monitoring received from the SDH/SONET interface section 10.1, as they are, to the switching control section 503 as event information (Step S604). This is because, since the switching control section 503 has been configured for SDH/SONET in the present exemplary embodiment, there is no need to transform the APS information.

When the control interface section 501 receives APS information (K1 and K2 bytes) and control information from the switching control section 503 (Step S605), the control interface section 501 transmits the K1 and K2 bytes, as they are, to the SDH/SONET interface section 10.1 (Step S606) and transmits the control information to the interface switch section 20 (Step S607). The APS information termination/insertion section 101.1 of the SDH/SONET interface section 10.1 inserts the K1 and K2 bytes received from the intra-device control section 50 into a transmission main signal. Moreover, if the received control information is switching control information generated due to a degradation of the reception signal on the working 0-system, a failure inside the 0-system device or the like, the interface switch section 20, in accordance with the switching control information, allows the selector switch 20 to switch from the 0-system to the 1-system, thereby selecting the 1-system as a working system. In this case, as described already, since the K1 and K2 bytes inserted into the transmission main signal also instructs to switch, similar switching of working system from the 0-system to the 1-system is also performed on the opposite device side.

4. Ethernet+Ethernet

Figure 9:
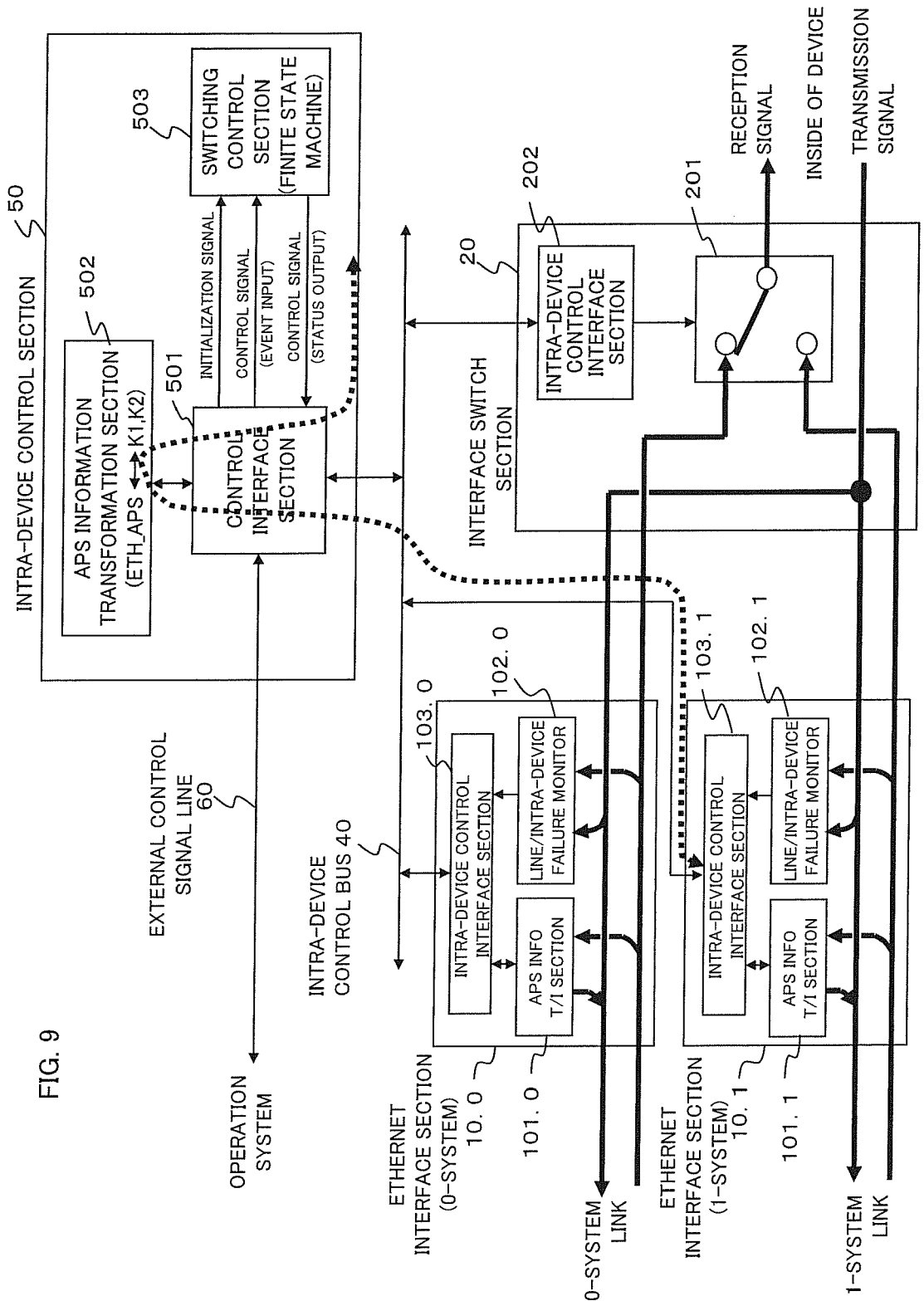
FIG. 9 is a block diagram of the interface switching device according to the present exemplary embodiment on which Ethernet interfaces are mounted for both of the 0- and 1-systems.
Figure 10:
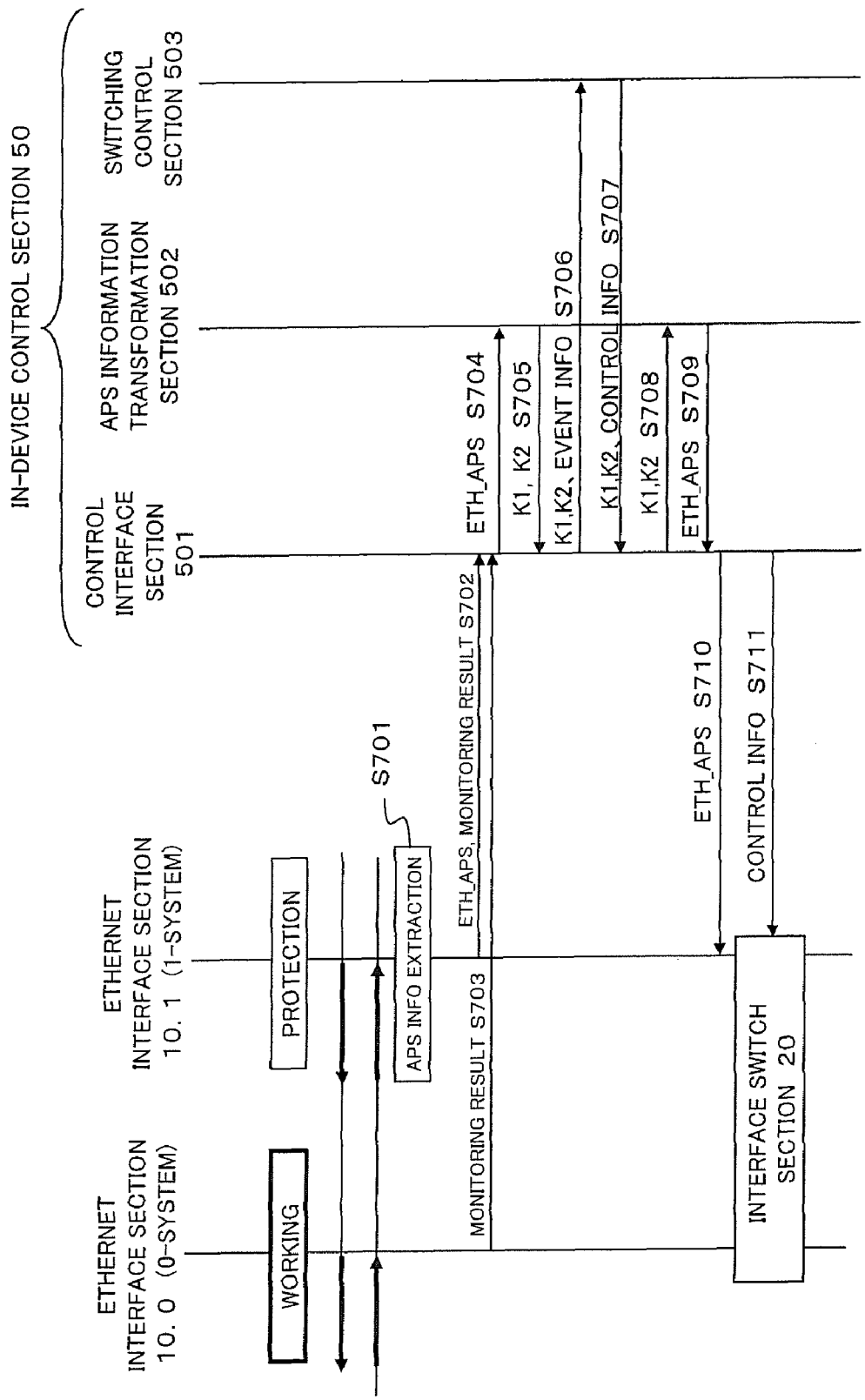
FIG. 10 is a sequence diagram for describing the operations of the interface switching device shown in FIG. 9.

FIG. 9 is a block diagram of the interface switching device according to the present exemplary embodiment on which Ethernet interfaces are mounted for both of the 0- and 1-systems. FIG. 10 is a sequence diagram for describing the operations of the interface switching device shown in FIG. 9.

Referring to FIG. 9, since the selector switch 201 selects the 0-system as a working system, Ethernet APS information ETH_APS is extracted by the 1-system interface section 10.1 (Step S701) and transmitted to the intra-device control section 50 along with a result of monitoring by the line/intra-device failure monitor section 102.1 (Step S702). The line/intra-device failure monitoring section 102.0 of the working-system interface section 10.0 transmits its own monitoring result to the intra-device control section 50 (Step S703).

The control interface section 501 of the intra-device control section 50 transfers the APS information ETH_APS received from the Ethernet interface section 10.1 first to the APS information transformation section 502 (Step S704). The APS information transformation section 502 transforms the Ethernet APS information ETH_APS into SDH/SONET APS information, K1 and K2 bytes, in accordance with the transformation rules shown in FIGS. 6 and 7 and returns the obtained APS information (K1 and K2 bytes) to the control interface section 501 (Step S705). The control interface section 501 transfers the result of line/intra-device monitoring received from the Ethernet interface section 10.1, the APS information (K1 and K2 bytes) input from the APS information transformation section 502, and the result of line/intra-device monitoring received from the Ethernet interface section 10.0 to the switching control section 503, as event information (Step S706).

When the control interface section 501 receives APS information (K1 and K2 bytes) and control information from the switching control section 503 (Step S707), the control interface section 501 transfers the K1 and K2 bytes to the APS information transformation section 502 (Step S708). The APS information transformation section 502 transforms the received APS information (K1 and K2 bytes) into Ethernet APS information ETH_APS in accordance with the transformation rules shown in FIGS. 6 and 7 and returns the obtained APS information ETH_APS to the control interface section 501 (Step S709).

The control interface section 501 transmits the APS information ETH_APS to the Ethernet interface section 10.1 (Step S710) and transmits the control information to the interface switch section 20 (Step S711). The APS information termination/insertion section 101.1 of the Ethernet interface section 10.1 inserts the APS information ETH_APS received from the intra-device control section 50 into a transmission main signal. Additionally, if the received control information is switching control information instructing to switch because of a degradation of the reception signal on the working 0-system, a failure inside the 0-system device or the like, the interface switch section 20, based on this switching control information, allows the selector switch 201 to switch from the 0-system to the 1-system, thereby selecting the 1-system as a working system. In this case, as described already, since the APS information ETH_APS inserted into the transmission main signal also instructs to switch, similar switching of working system from the 0-system to the 1-system is also performed on the opposite device side.

5. SDH/SONET (Working)+Ethernet

Figure 11:
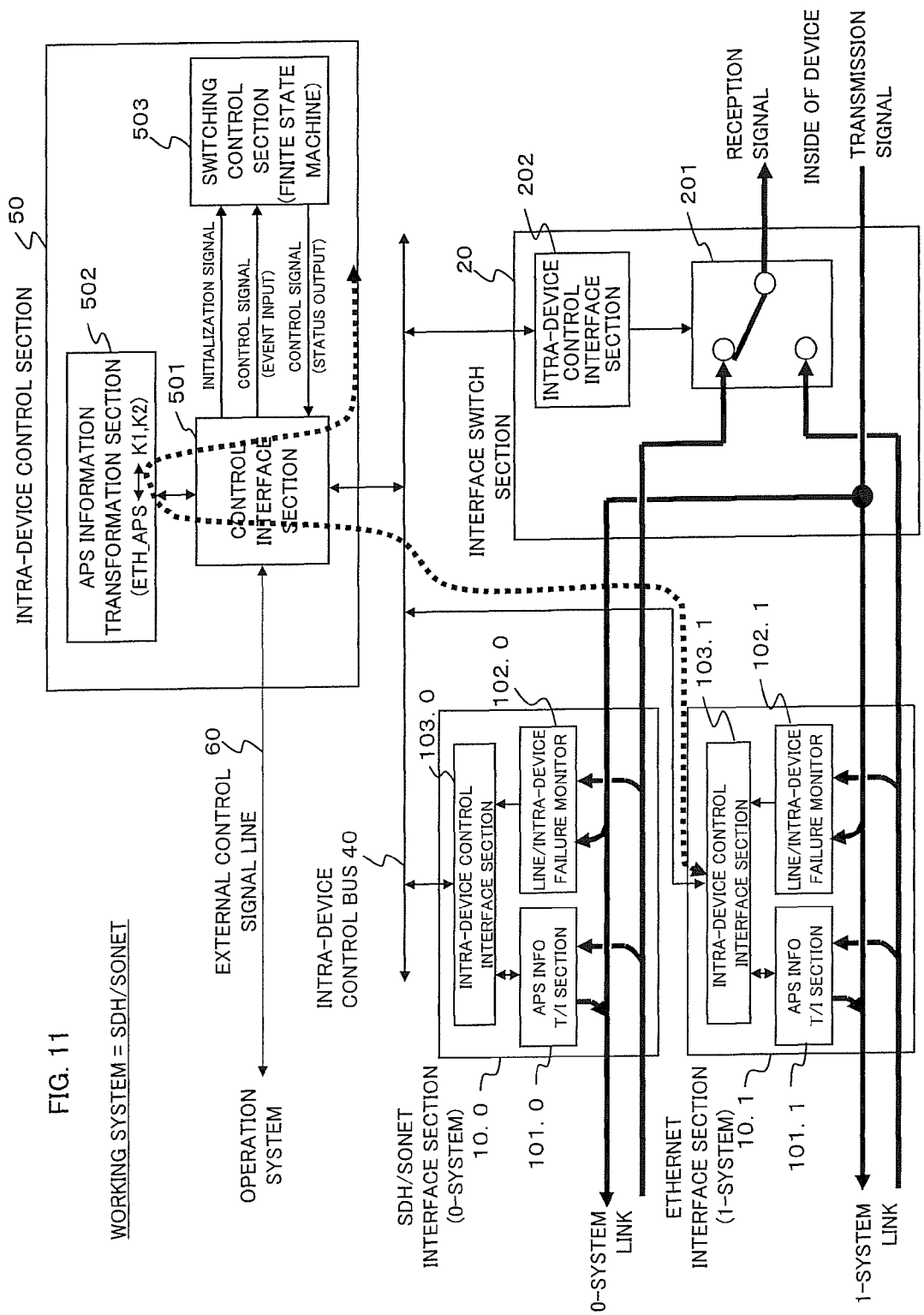
FIG. 11 is a block diagram of the interface switching device according to the present exemplary embodiment in which a 0-system interface section serves as a SDH/SONET interface and a 1-system interface section serves as an Ethernet interface.
Figure 12:
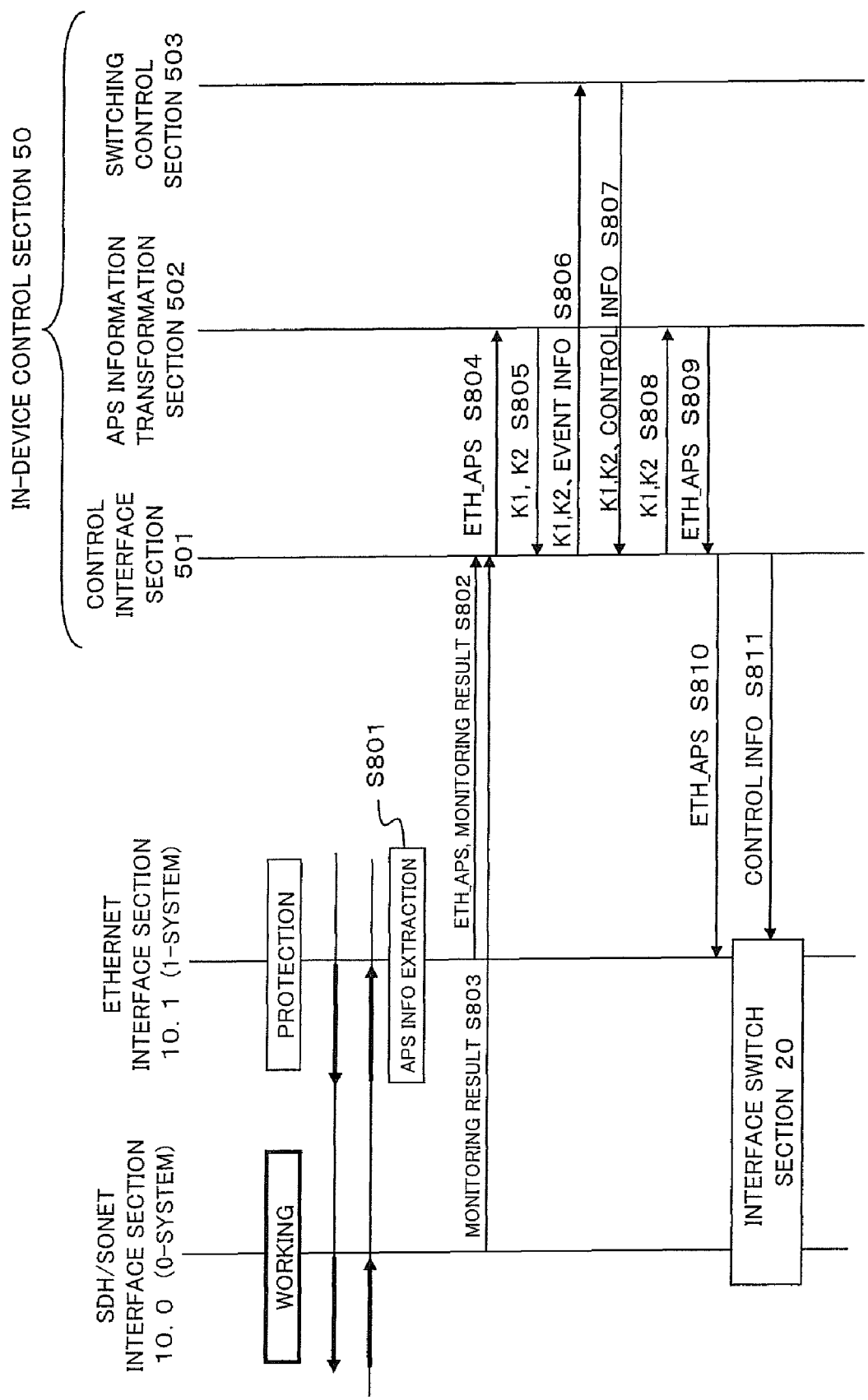
FIG. 12 is a sequence diagram for describing the operations of the interface switching device shown in FIG. 11.

FIG. 11 is a block diagram of the interface switching device according to the present exemplary embodiment in which the 0-system interface section functions as a SDH/SONET interface and the 1-system interface section functions as an Ethernet interface. FIG. 12 is a sequence diagram for describing the operations of the interface switching device shown in FIG. 11.

Referring to FIG. 11, since the selector switch 201 selects the 0-system as a working system, APS information is obtained at the 1-system Ethernet interface section 10.1. That is, Ethernet APS information ETH_APS is extracted by the Ethernet interface section 10.1 (Step S801) and transmitted to the intra-device control section 50 along with a result of monitoring by the line/intra-device failure monitor section 102.1 (Step S802). The line/intra-device failure monitor section 102.0 of the working-system SDH/SONET interface section 10.0 transmits its own monitoring result to the intra-device control section 50 (Step S803).

The control interface section 501 of the intra-device control section 50 transfers the APS information ETH_APS received from the Ethernet interface section 10.1 first to the APS information transformation section 502 (Step S804). The APS information transformation section 502 transforms the Ethernet APS information ETH_APS into SDH/SONET APS information, K1 and K2 bytes, in accordance with the transformation rules shown in FIGS. 6 and 7 and returns the obtained APS information (K1 and K2 bytes) to the control interface section 501 (Step S805). The control interface section 501 transfers the result of line/intra-device monitoring received from the Ethernet interface section 10.1, the APS information (K1 and K2 bytes) input from the APS information transformation section 502, and the result of line/intra-device monitoring received from the SDH/SONET interface section 10.0 to the switching control section 503, as event information (Step S806).

When the control interface section 501 receives APS information (K1 and K2 bytes) and control information from the switching control section 503 (Step S807), the control interface section 501 transfers the K1 and K2 bytes to the APS information transformation section 502 (Step S808). The APS information transformation section 502 transforms the received APS information (K1 and K2 bytes) into Ethernet APS information ETH_APS in accordance with the transformation rules shown in FIGS. 6 and 7 and returns the obtained APS information ETH_APS to the control interface section 501 (Step S809).

The control interface section 501 transmits the APS information ETH_APS to the Ethernet interface section 10.1 (Step S810) and transmits the control information to the interface switch section 20 (Step S811). The APS information termination/insertion section 101.1 of the Ethernet interface section 10.1 inserts the APS information ETH_APS received from the intra-device control section 50 into a transmission main signal. Additionally, if the received control information is switching control information instructing to switch because of a degradation of the reception signal on the working 0-system, a failure inside the 0-system device or the like, the interface switch section 20, based on this switching control information, allows the selector switch 201 to switch from the 0-system to the 1-system, thereby selecting the 1-system as a working system. In this case, as described already, since the APS information ETH_APS inserted into the transmission main signal also instructs to switch, similar switching of working system from the 0-system to the 1-system is also performed on the opposite device side.

6. SDH/SONET+Ethernet (Working)

Figure 13:
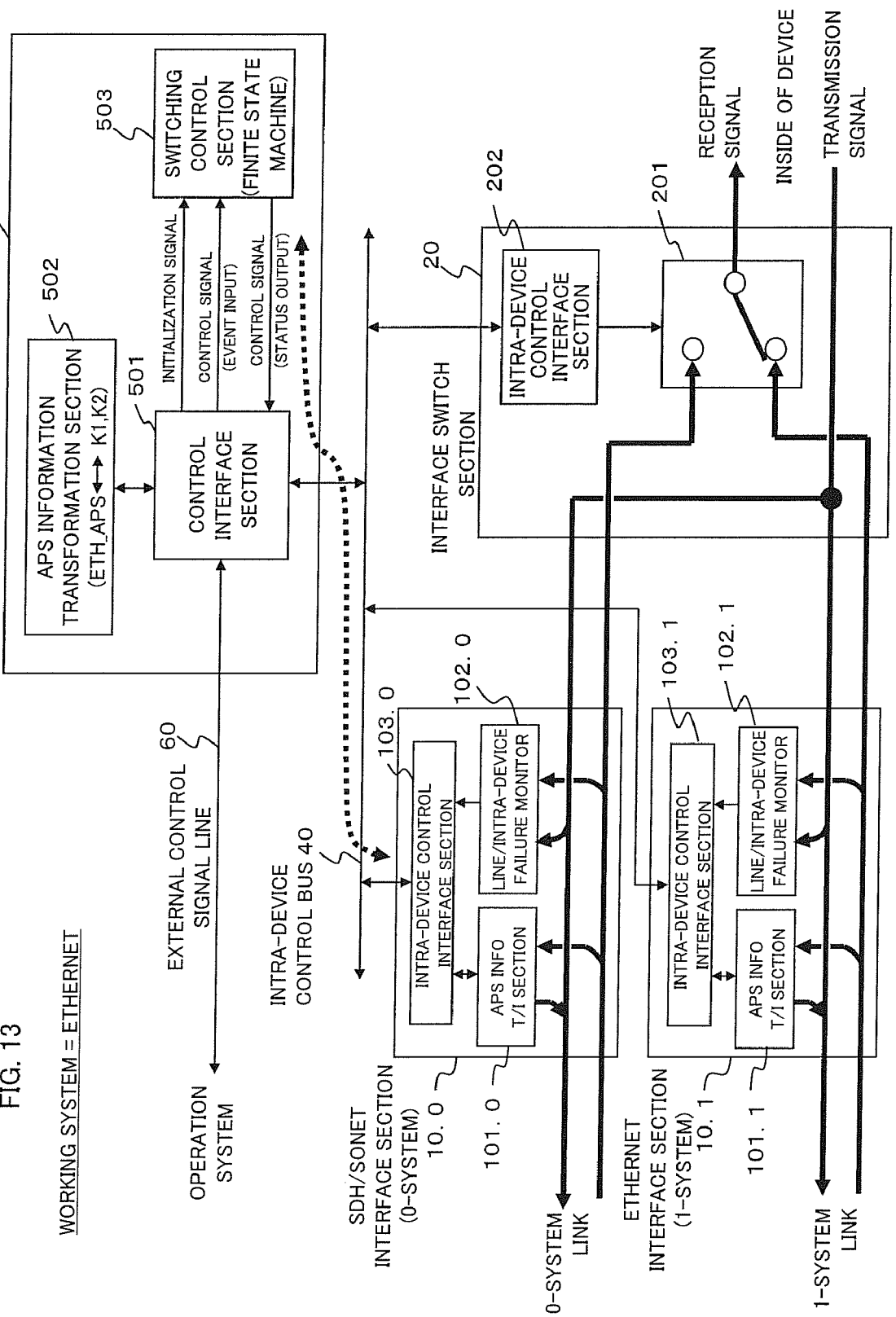
FIG. 13 is a block diagram of the interface switching device according to the present exemplary embodiment in which the 0-system interface section serves as a SDH/SONET interface and the 1-system interface section serves as an Ethernet interface.
Figure 14:
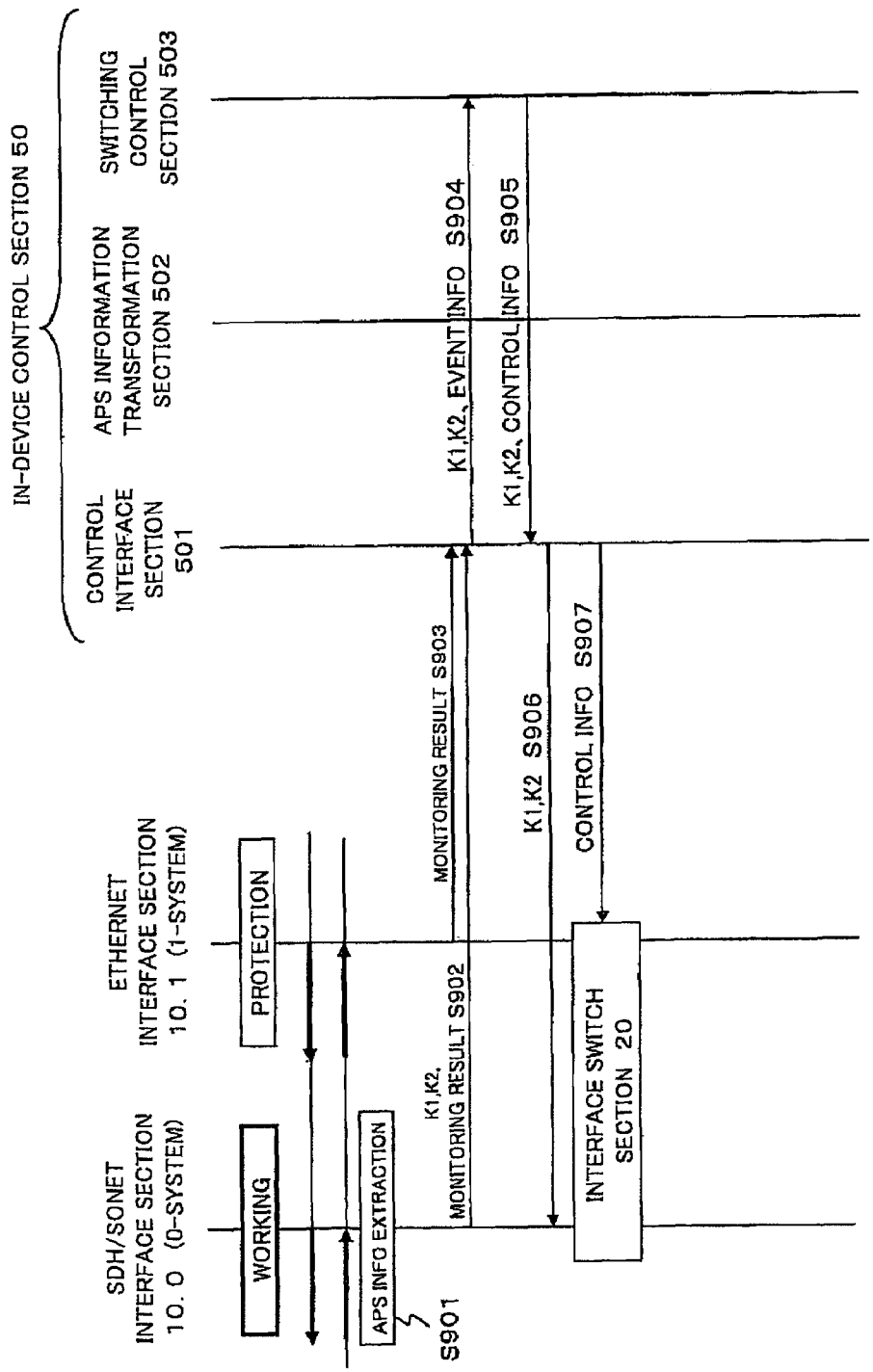
FIG. 14 is a sequence diagram for describing the operations of the interface switching device shown in FIG. 13.

FIG. 13 is a block diagram of the interface switching device according to the present exemplary embodiment in which the 0-system interface section functions as a SDH/SONET interface and the 1-system interface section functions as an Ethernet interface. FIG. 14 is a sequence diagram for describing the operations of the interface switching device shown in FIG. 13.

Referring to FIG. 13, since the selector switch 201 selects the 1-system as a working system, APS information is obtained at the 0-system SDH/SONET interface section 10.0. That is, K1 and K2 bytes, which are SDH/SONET APS information, are extracted by the 0-system interface section 10.0 (Step S901) and transmitted to the intra-device control section 50 along with a result of monitoring by the line/intra-device failure monitor section 102.0 (Step S902). The line/intra-device failure monitor section 102.1 of the working-system Ethernet interface section 10.1 transmits its own monitoring result to the intra-device control section 50 (Step S903).

The control interface section 501 of the intra-device control section 50 transfers the APS information (K1 and K2 bytes) and the result of line/intra-device monitoring received from the SDH/SONET interface section 10.0 and the result of line/intra-device monitoring received from the Ethernet interface section 10.1, as they are, to the switching control section 503, as event information (Step S904). This is because, since the switching control section 503 has been configured for SDH/SONET in the present exemplary embodiment, there is no need to transform the APS information.

When the control interface section 501 receives APS information (K1 and K2 bytes) and control information from the switching control section 503 (Step S905), the control interface section 501 transmits the K1 and K2 bytes, as they are, to the SDH/SONET interface section 10.0 (Step S906) and transmits the control information to the interface switch section 20 (Step S907). The APS information termination/insertion section 101.0 of the SDH/SONET interface section 10.0 inserts the K1 and K2 bytes received from the intra-device control section 50 into a transmission main signal. Additionally, if the received control information is switching control information instructing to switch because of a degradation of the reception signal on the working 1-system, a failure inside the 1-system device or the like, the interface switch section 20, based on this switching control information, allows the selector switch 201 to switch from the 1-system to the 0-system, thereby selecting the 0-system as a working system. In this case, as described already, since the K1 and K2 bytes inserted into the transmission main signal also instructs to switch, similar switching of working system from the 1-system to the 0-system is also performed on the opposite device side.

7. System Example

FIG. 15 is a sequence diagram showing APS information communication in a redundant system in which nodes are link-connected, each node having the interface switching device according to the present exemplary embodiment. Here, it is assumed that each of the west and east nodes is provided with the interface switching device shown in FIG. 9 on which Ethernet interfaces are mounted for both of the 0- and 1-systems.

Assuming that the 0-system is selected as a working system, Ethernet APS information is extracted by the 1-system interface section 10.1 and transmitted to the intra-device control section 50, where, by referring to the APS information transformation section 502, the Ethernet APS information is transformed to SDH/SONET APS information, K1 and K2 bytes, which are then transferred to the switching control section 503. For example, Ethernet APS information including "No Request (NR) (r/b=null)" is transmitted from each of the west and east nodes to the other and, on each side, transformed to SDH/SONET APS information including "No request," which is then transferred to the switching control section 503.

When it is detected that some failure has occurred in the working 0-system from the west node to the east node, the switching control section 503 in the east node, in response to this detection, outputs to the control interface section 501 K1 and K2 bytes including as the type of request, for example, "1101," which represents "Signal fail high priority" in SDH/SONET. The SDH/SONET K1 and K2 bytes including "1101" for "Signal fail high priority" are transformed by the APS information transformation section 502 to Ethernet APS information ETH_APS including "1011," which represents "Signal Fail for Working (SF)" in Ethernet. The Ethernet APS information ETH_APS is then inserted into a transmission main signal by the APS information termination/insertion section 101.1 of the Ethernet interface section 10.1. Thus, the Ethernet APS information ETH_APS including "1011" for "Signal Fail for Working (SF)" is transmitted to the west node through the 1-system link.

In the west node, the Ethernet APS information ETH_APS including "1011" for "Signal Fail for Working (SF)" is extracted from the 1-system reception main signal by the APS information termination/insertion section 101.1 of the interface section 10.1 and transmitted to the intra-device control section 50. The control interface section 501 of the intra-device control section 50 allows the APS information transformation section 502 to transform the Ethernet APS information ETH_APS including "1011" for "Signal Fail for Working (SF)" to K1 and K2 bytes including "1101" for "Signal fail high priority" and outputs the obtained K1 and K2 bytes to the switching control section 503 (see FIG. 5).

Since the working system is in a failed state as indicated by "Signal fail high priority," the switching control section 503 in the west node determines to switch interfaces. The switching control section 503 transmits switching control information to the interface switch section 20, whereby the selector switch 201 switches working system from the 0-system to the 1-system. The switching control section 503, in parallel with this switching control, outputs to the control interface section 501 K1 and K2 bytes including "0010," which represents "Reverse request," to respond to the east node with an acknowledgement of link switching. The control interface section 501 allows the APS information transformation section 502 to transform the K1 and K2 bytes including "0010" for "Reverse request" to Ethernet APS information ETH_APS including "0000," which represents "No Request (NR) (r/b=normal traffic)" (see FIG. 6). The Ethernet APS information ETH_APS is then inserted into a transmission main signal by the APS information termination/insertion section 101.1 of the Ethernet interface section 10.1 and thereby transmitted to the east node through the 1-system link.

In the east node, the APS information termination/insertion section 101.1 of the Ethernet interface section 10.1 extracts from the reception main signal the Ethernet APS information ETH_APS including "0000" for "No Request (NR) (r/b=normal traffic)," which is then transformed by the APS information transformation section 502 of the intra-device control section 50 to K1 and K2 bytes including "0010" for "Reserve request," which are then output to the switching control section 503. In this manner, upon the occurrence of a signal fail in the 0-system link, the switching of working system from the 0-system to the 1-system is performed in both of the east and west nodes, whereby communication is continued through the 1-system link without interruption.

When the 0-system link from the west node to the east node is recovered and the line/intra-device failure monitor section 102.0 of the interface section 10.0 in the east node detects the recovery, then, in response to this detection, the switching control section 503 in the east node is assumed to output K1 and K2 bytes including "Do not revert," for example. These K1 and K2 bytes including "Do not revert" are transformed by the APS information transformation section 502 to Ethernet APS information ETH_APS including "Do Not Revert (DNR)," which is then inserted into a transmission main signal by the APS information termination/insertion section 101.0 of the Ethernet interface section 10.0. Thus, the Ethernet APS information ETH_APS including "Do Not Revert (DNR)" is transmitted to the west node through the 0-system link.

In the west node, the Ethernet APS information ETH_APS including "Do Not Revert (DNR)" is extracted from the 0-system reception main signal by the APS information termination/insertion section 101.0 of the interface section 10.0 and transmitted to the intra-device control section 50. The control interface section 501 of the intra-device control section 50 allows the APS information transformation section 502 to transform the Ethernet APS information ETH_APS including "Do Not Revert (DNR)" to K1 and K2 bytes including "Do not revert," which are then output to the switching control section 503 (see FIG. 6).

Based on the K1 and K2 bytes including "Do not revert," the switching control section 503 in the west node determines not to perform interface switching from the working 1-system and performs no switching control on the interface switch section 20. Accordingly, the selector switch 201 remains selecting the 1-system as a working system. In parallel with this control, the switching control section 503 outputs to the control interface section 501 K1 and K2 bytes including "Reverse request" to respond to the east node. The control interface section 501 allows the APS information transformation section 502 to transform the K1 and K2 bytes including "Reverse request" into Ethernet APS information ETH_APS including "No Request (NR) (r/b=normal traffic)" (see FIG. 6), which is then inserted into a transmission main signal by the APS information termination/insertion section 101.0 of the Ethernet interface section 10.0 and thereby transmitted to the east node through the 0-system link.

In the east node, the APS information termination/insertion section 101.0 of the Ethernet interface section 10.0 extracts from the reception main signal the Ethernet APS information ETH_APS including "No Request (NR) (r/b=normal traffic)," which is then transformed by the APS information transformation section 502 of the intra-device control section 50 into K1 and K2 bytes including "Reverse request," which are then output to the switching control section 503. In this manner, after the 0-system link has been recovered, the 1-system is remained selected as a working system in both of the west and east nodes, and communication is continued.

As described above, according to the present exemplary embodiment, the single switching control section 503 of the intra-device control section 50 can be used for SDH/SONET and for Ethernet. Accordingly, it is possible to simplify the device configuration and thus to economize the device. Since a redundant system can be constructed by arbitrarily combining SDH/SONET and Ethernet interfaces, it is possible to build a more flexible network architecture.

In addition, the types of interfaces can be changed at an instantaneous-decision level by utilizing redundant switching. Specifically, switching is first performed on a protection-system interface section, and after this switching is complete, switching is performed on the other interface section.

8. Other Exemplary Embodiments

In the above-described exemplary embodiment, description has been given of the case where the switching control section 503 of the intra-device control section 50 is configured for SDH/SONET. However, similar effects can also be obtained in a case where, with the switching control section 503 configured for Ethernet, the directions of transformation by the APS information transformation section 502 in the above-described exemplary embodiment are reversed. For example, in the case of SDH/SONET+SDH/SONET, it is necessary to perform ASP information transformation from ASP information for SDH/SONET to APS information for Ethernet, by using the ASP information transformation section 502. In the case of Ethernet+Ethernet, transactions can be performed directly with the switching control section 503, without using the APS information transformation section 502. Moreover, in the case of SDH/SONET (working)+Ethernet, transactions can be performed directly with the switching control section 503, without using the APS information transformation section 502, but in the case of SDH/SONET+Ethernet (working), transformation is needed, using the APS information transformation section 502.

Additionally, in the above-described exemplary embodiment, shown is the exemplary case where two types of network interfaces, SDH/SONET and Ethernet, are accommodated. However, similar effects can be obtained by applying the present invention to any communications system as long as the communications system is a redundant system based on a protocol using APS information and accommodating three or more different types of network interfaces. Similarly, the present invention is not limited to 1+1 bidirectional systems but can also be applied to 1:1 or 1:n architectures.

The present invention is applicable to redundant communications systems in general and particularly to redundant systems accommodating different types of network interfaces.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An interface switching device including a first network interface comprising a first type of network interface, and a second network interface comprising a second type of network interface different from the first type of network interface, each network interface connected to a corresponding link of a redundant system, the interface switching device comprising:

an automatic switch information transformer for transforming automatic switch information between a predetermined type used for a predetermined network interface and each of other types used for network interfaces other than the predetermined network interface;

a switch controller for inputting automatic switch information of the predetermined type and event information to perform switch control of the first and second network interfaces; and a control interface section for: (a) connecting the first network interface to the switch controller via the automatic switch information transformer when first automatic switch information received from the first network interface is not of the predetermined type, so that the automatic switch information transformer transforms the first automatic switch information into the predetermined type, and (b) connecting the first network interface directly to the switch controller when the first automatic switch information is of the predetermined type; and an interface switch section coupled to the first and second network interfaces, wherein the interface switch section is configured to: (a) select the first network interface as a working line and the second network interface as a protection line, and (b) under the switch control of the switch controller, switch the selection of the working line from the first network interface to the second network interface, wherein the first and second network interfaces of the redundant system includes a digital synchronous network interface and an Ethernet interface.

2. The interface switching device according to claim 1, wherein the control interface controls such that, when the first automatic switch information is of a type other than the predetermined type, the first automatic switch information is transformed by the automatic switch information transformer into the predetermined type and its transform is sent to the switch controller and, when receiving second automatic switch information of the predetermined type in response to the first automatic switch information from the switch controller, the second automatic switch information is transformed by the automatic switch information transformer into the other type and its transform is sent to the first network interface.

3. The interface switching device according to claim 1, wherein the automatic switch information transformer performs transformation between APS (Automatic Protection Switch) information (K1, K2) of SDH (Synchronous Digital Hierarchy)/SONET (Synchronous Optical Network) and APS information (APS frame) of Ethernet.

4. The interface switching device according to claim 1, wherein the first automatic switch information is received from the first network interface for protection.

5. The interface switching device according to claim 1, wherein the interface switching device comprises a plurality of network interfaces, each network interface comprising a corresponding unique type of interface.

6. An interface switching method in a node of a redundant system, wherein the node is connected to a plurality of links of the redundant system, wherein the node comprises:

a first network interface comprising a first type of network interface, and a second network interface comprising a second type of network interface different from the first type of network interface, each network interface connected to a corresponding link of the redundant system;

an automatic switch information transformer for transforming automatic switch information between a predetermined type used for a predetermined network interface and each of other types used for network interfaces other than the predetermined network interface; and a switch controller for inputting automatic switch information of the predetermined type and event information to perform switch control of the first and second network interfaces, the method comprising:

a) connecting the first network interface to the switch controller via the automatic switch information transformer when first automatic switch information received from the first network interface is not of the predetermined type, so that the automatic switch information transformer transforms the first automatic switch information into the predetermined type;

b) connecting the first network interface directly to the switch controller when the first automatic switch information is of the predetermined type;

c) selecting the first network interface as a working line and the second network interface as a protection line; and d) under the switch control of the switch controller, switching the selection of the working line from the first network interface to the second network interface, wherein the first and second network interfaces of the redundant system includes a digital synchronous network interface and an Ethernet interface.

7. The interface switching method according to claim 6, wherein the a) comprises:

the automatic switch information transformer transforming the first automatic switch information which is not of the predetermined type to a first transform of the predetermined type;

outputting the first transform to the switch controller;

when receiving second automatic switch information of the predetermined type in response to the first automatic switch information from the switch controller, the automatic switch information transformer transforming the second automatic switch information to a second transform of a type used for the first network interface; and transmitting the second transform to the first network interface.

8. The interface switching method according to claim 6, wherein the automatic switch information transformer performs transformation between APS (Automatic Protection Switch) information (K1, K2) of SDH (Synchronous Digital Hierarchy)/SONET (Synchronous Optical Network) and APS information (APS frame) of Ethernet.

9. The interface switching method according to claim 6, wherein the node comprises a plurality of network interfaces, each network interface comprising a corresponding unique type of interface.

10. A non-transitory computer readable medium having stored thereon executable instructions that when executed by the processor of a computer control the computer to function as an interface switching device in a redundant system including a first network interface comprising a first type of network interface, and a second network interface comprising a second type of network interface different from the first type of network interface, each network interface connected to a corresponding link of a redundant system executable instructions control the computer to:

provide an automatic switch information transformer function for transforming automatic switch information between a predetermined type used for a predetermined network interface and each of other types used for network interfaces other than the predetermined network interface;

provide a switch controller function for inputting automatic switch information of the predetermined type and event information to perform switch control of the first and second network interfaces;

connect the first network interface to the switch controller function via the automatic switch information transformer function when first automatic switch information received from the first network interface is not of the predetermined type, so that the first automatic switch information is transformed into the predetermined type;

connect the first network interface directly to the switch controller function when the first automatic switch information is of the predetermined type;

select the first network interface as a working line and the second network interface as a protection line; and under the switch control of the switch controller function, switch the selection of the working line from the first network interface to the second network interface, wherein the first and second network interfaces of the redundant system includes a digital synchronous network interface and an Ethernet interface.

11. The computer readable medium according to claim 10, wherein the executable instructions further control the computer such that, when the first automatic switch information is of a type other than the predetermined type, the first automatic switch information is transformed by the automatic switch information transformer function into the predetermined type and its transform is sent to the switch controller function and, when receiving second automatic switch information of the predetermined type in response to the first automatic switch information from the switch controller, the second automatic switch information is transformed by the automatic switch information transformer function into the other type and its transform is sent to the first network interface.

12. A redundant system comprising:

a pair of nodes connected by a plurality of links in parallel, wherein each node comprises:

a first network interface comprising a first type of network interface, and a second network interface comprising a second type of network interface different from the first type of network interface, each network interface connected to a corresponding parallel link of the redundant system;

an automatic switch information transformer for transforming automatic switch information between a predetermined type used for a predetermined network interface and each of other types used for network interfaces other than the predetermined network interface;

a switch controller for inputting automatic switch information of the predetermined type and event information to perform switch control of the plurality of network interfaces;

a control interface section for:

(a) connecting the first network interface to the switch controller via the automatic switch information transformer when first automatic switch information received from the first network interface is not of the predetermined type, so that the automatic switch information transformer transforms the first automatic switch information into the predetermined type, and (b) connecting the first network interface directly to the switch controller when the first automatic switch information is of the predetermined type; and an interface switch section coupled to the first and second network interfaces, wherein the interface switch section is configured to: (a) select the first network interface as a working line and the second network interface as a protection line, and (b) under the switch control of the switch controller, switch the selection of the working line from the first network interface to the second network interface, wherein the first and second network interfaces of the redundant system includes a digital synchronous network interface and an Ethernet interface.

13. The redundant system according to claim 12, wherein the control interface controls such that, when the first automatic switch information is of a type other than the predetermined type, the first automatic switch information is transformed by the automatic switch information transformer into the predetermined type and its transform is sent to the switch controller and, when receiving second automatic switch information of the predetermined type in response to the first automatic switch information from the switch controller, the second automatic switch information is transformed by the automatic switch information transformer into the other type and its transform is sent to the first network interface.

14. The redundant system according to claim 12, wherein the automatic switch information transformer performs transformation between APS (Automatic Protection Switch) information (K1, K2) of SDH (Synchronous Digital Hierarchy)/SONET (Synchronous Optical Network) and APS information (APS frame) of Ethernet.

15. The redundant system according to claim 12, wherein each node comprises a plurality of network interfaces, each network interface comprising a corresponding unique type of interface.

* * * * *